Jan. 12, 1954    W. A. REX ET AL    2,666,076
PREPARATION OF ALUMINUM ALCOHOLATE
Filed April 24, 1952
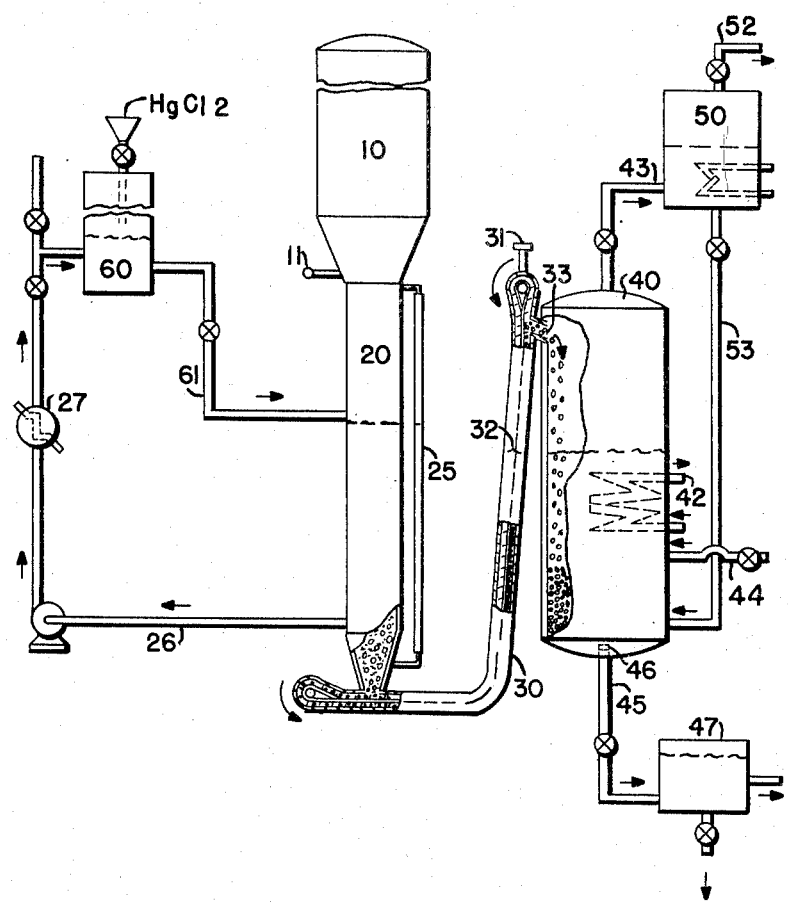
Walter A. Rex
Raymond W. Winkler    Inventors
By Peter H. Smolka  Attorney Patented Jan. 12, 1954

2,666,076

UNITED STATES PATENT OFFICE 2,666,076

PREPARATION OF ALUMINUM ALCOHOLATE

Walter A. Rex and Raymond W. Winkler, Westfield, N. J., assignors to Standard Oil Development Company, a corporation of Delaware Application April 24, 1952, Serial No. 284,126

7 Claims. (Cl. 260—448)

This invention relates to an improved method and apparatus for making aluminum alcoholate from aluminum and amyl alcohol or the like. It relates particularly to a system wherein granules of aluminum are fed to a hydrogen evolving reactor through a liquid seal which may consist of a relatively non-reactive solution of mercuric chloride or other activating agent. The liquid seal thus serves to activate the aluminum without contaminating the main reactor and allows feeding the activated aluminum to the reactor without re-exposing it to air. At the same time the liquid seal prevents the potentially dangerous introduction of air into the hydrogen containing reactor, and also may be used as a convenient means for measuring aluminum feed.

Aluminum alcoholate is a valuable material used, for instance, in the preparation of synthetic cracking catalysts of the silica-alumina gel type. An improved method for making such catalysts from aluminum alcoholate has been described, for example, in copending application Serial No. 214,058, filed on March 6, 1951, by Whiteley et al., and reference may be had thereto for operating details. However, even this improved method has not been entirely satisfactory when attempted on a continuous scale because the presence of activating solution in the reactor has tended to contaminate the product and to form inorganic sludge. On the other hand, when activation of aluminum was attempted outside of the main reactor, the aluminum tended to lose its activity before it could be reacted with alcohol and air tended to leak into the hydrogen filled reactor, resulting in undue explosion hazards.

It is one of the main objects of this invention to eliminate these difficulties and to devise a process wherein aluminum alcoholate of high purity can be safely and effectively manufactured on a continuous basis. Other and more detailed objects will become apparent from the subsequent description.

A system suitable for carrying out the present invention will now be described with reference to the attached drawing. Granules of aluminum obtained, for instance, by shearing aluminum ingots and ranging in size between about 0.1 to 2 inches or preferably between about 0.5 to 1 inch in diameter, are stored in vessel 10. Finer granules are usually undesirable since they tend to give too much aluminum oxide, make control of reaction rate difficult and may be difficult to transport to the main reactor. The aluminum, while preferably pure, may likewise be impure or even alloyed with copper or the like.

From vessel 10 the aluminum granules are charged by means of valve 11 to hopper 20 which is partially filled with an activating solution such as a 1% solution of mercuric chloride in amyl alcohol withdrawn from dissolving tank 60 via line 61. Valve 11 is preferably operated at rather long intervals so as to permit accurate measurement of aluminum withdrawal from hopper 20 as also later described. However, where hopper 20 is not depended on for measuring aluminum feed rate, aluminum may be fed into the hopper continuously, for instance, with the aid of a star feeder or the like.

The bottom of hopper 20 is connected to an enclosed, substantially air-tight mechanical conveyor 30 which forms a U-bend with hopper 20 and lifts granules of activated aluminum to reactor 40 via reactor opening 41. The conveyor may conveniently be of the Redler type wherein rakes lift the granules along the walls of the conveyor enclosure, but other enclosed conveyors using perforated buckets or feed screws or the like may similarly be used. The main requirements of a suitable conveyor are that it must be air tight and capable to lift solids from a bath and deliver them almost dry to the reactor.

While the aluminum granules reside in the solution in hopper 20 and conveyor 30, they become activated, possibly by a mechanism involving removal of an oxide film from the metal surface. Since the activating solution forms a liquid seal which keeps atmospheric air out of the system and since the atmosphere in reactor 40 is free of oxygen during the course of the reaction, the present arrangement allows removing activated aluminum from the activating bath and transferring it substantially dry to reactor 40, without any appreciable deactivation by air. In addition to preventing deactivation of the aluminum by air when it is lifted above liquid level 32 in conveyor 30, the liquid seal of activating solution serves to keep air from getting into reactor 40 where potentially explosive hydrogen is evolved during the process. At the same time, the present arrangement allows keeping the activating solution almost entirely outside of the main reactor 40. As a result sludge formation in the reactor and possible contamination of subsequent process streams with corrosive mercury salts is substantially avoided. In contrast, the prior art operated largely on the belief that the activation of aluminum was essentially a catalytic effect, and consequently activating solutions have heretofore generally been added directly to the main reaction mixture, thereby leading to undesirable contamination.

For further safety and efficiency it is desirable to flush enclosed conveyor 30 and reactor 40 essentially free of air before the process is started up. For this purpose an inert gas such as nitrogen or flue gas may be introduced through gas inlet 31 and vented from reactor 40 via line 43.

In addition to the metallic aluminum already mentioned, the principal reagent in reactor 40 is a substantially anhydrous alcohol which is liquid at reaction temperature. This alcohol is preferably a higher aliphatic one, especially amyl alcohol or commercial mixtures containing amyl alcohol or its isomers, but the various octyl, lauryl or even octadecyl alcohols may also be used individually or in mixtures. These alcohols are fairly insoluble in water and therefore more easily recovered when the alcoholate is hydrolyzed. However, where it is not necessary to hydrolyze the alcoholate product, or where alcohol recovery after hydrolysis is not particularly important, water soluble alcohols such as ethyl, isopropyl or tertiary butyl may also be used.

In some cases, a selected hydrocarbon such as heptane, octane, toluene, xylene, etc. or a hydrocarbon fraction such as a petroleum distillate boiling between about 200-500° F. or higher may be added to the alcohol reagent. Such hydrocarbon addition may reduce losses of valuable alcohol vapors from reactor 40, moderates the reaction rate, and facilitates recovery of the alcohol after eventual hydrolysis. Accordingly, it is preferred to use a petroleum distillate of narrow boiling range which approximately coincides with or includes the boiling range of the alcohol used. For example, for use with mixed amyl alcohols, a petroleum cut boiling between 220 and 290° F. is satisfactory.

Thus, instead of pure alcohol, the liquid in reactor 40 may typically consist of about equal parts of amyl alcohol and a petroleum hydrocarbon fraction boiling between 220 and 290° F. This liquid may be introduced into the reactor from a storage tank, not shown, via line 44. Reactor 40 may be maintained at atmospheric or superatmospheric pressure up to about 100 lbs. per square inch. It is preferable, however, to operate at pressures in the range of 15-25 lbs. per square inch absolute. Such moderate pressure generally raises the boiling point of the alcohol and hydrocarbon sufficiently to allow operating the process at temperatures giving the desired reaction rate.

To initiate the reaction between the aluminum and the alcohol, the mixture in reactor 40 must first be brought to reaction temperature. Illustrative steam heating coil 42 is shown for this purpose in the drawing. For instance, the contents of reactor 40 may be heated initially to a temperature about 200-300° F., preferably about 240-265° F., in the case of the reaction mixture described, but other temperatures may of course be preferred depending upon the particular alcohol and petroleum diluent used and upon the pressure of the system. However, once the reaction is well under way it becomes rapid, and it will usually become necessary to cool the contents of the reactor to maintain them at the desired temperature.

For this purpose, a cooling medium such as water may be piped through coil 42 after the initial stage to remove excess heat. However, the preferred method of cooling involves principally the alcohol reflux which may be returned to reactor 40 via line 53 after cooling to any suitable temperature in condenser 50. Still other methods for maintaining the desired temperature may be used. For instance a minor sidestream may be withdrawn from reactor 40 and passed through an external cooler before returning it to the reactor.

The aluminum and alcohol react to form aluminum alcoholate, also known as aluminum alkoxide, and hydrogen. Vapors and gases pass overhead through line 43 and reflux condenser 50 which is preferably operated at a temperature low enough so that the alcohol and hydrocarbon vapors are condensed well below the temperature in reactor 40, leaving substantially pure hydrogen in the gas phase. The hydrogen may then be withdrawn via line 52, and the condensed liquid returned to reactor 40 via line 53, thus furnishing the required cooling. Suitable instrumentation may be provided according to well known principles for controlling reactor temperature, pressure and the amount of alcohol and hydrocarbon carried by the hydrogen to the condenser 50.

When it is desired to shut down the system, an inert gas such as flue gas, nitrogen or the like may again be introduced through inlet 31 to purge hydrogen before the system is opened to the atmosphere.

The mixture of aluminum alcoholate and liquid alcohol may be withdrawn from reactor 40 continuously through line 45, preferably providing a screen 46 having openings of about 50 to 100 mesh to keep out unreacted solid aluminum particles and impurities. Additional removal of solids may also be effected in settling tank 46. Where the aluminum alcoholate product is to be used for making an alumina hydrosol, it may be mixed with a peptizing agent such as glacial acetic acid or aluminum chloride prior to hydrolysis.

One of the important features of the invention is the relation of hopper 20 and conveyor 30 which form a U-bend partially filled with activating solution maintained at temperatures sufficiently low to keep the alcohol from reacting with the aluminum, e. g. below 100 or 150° F. The temperature of the liquid in hopper 20 may be maintained by recycling a sidestream 26 via heat exchanger 27 to dissolving tank 60 and back via line 61 to hopper 20. This also helps to keep the potency of the activating solution approximately constant. The solution in the U-bend acts as a liquid seal between hydrogen-filled reactor 40 and the air in the surrounding atmosphere. This arrangement also makes it possible to activate the surface of the aluminum in a separate step without risk of subsequent deactivation and without contaminating the reactor 40 wherein the main reaction is confined. Still another important feature of the invention is that the liquid level in hopper 20 as determined by means of gauge glass 25 or some other level indicating device, provides a convenient and accurate method of measuring the rate of feed of aluminum to reactor 40. Hopper 20 may be calibrated so that the drop of liquid level therein serves as a direct measure of activated aluminum removed by the conveyor.

The activating solution is preferably an alcoholic solution of mercuric chloride. But, solutions of ferric chloride, stannic chloride, cupric chloride, boron trioxide, or iodine, may be used similarly. The main purpose of this solution is to make the aluminum feed more reactive with alcohol in the main reaction. The concentration of the activating agent in the solution may be about 0.1 to 5 weight percent, e. g., preferably 0.5 to 2 weight percent in the case of mercuric chloride. The solvent used in making up the activating solution is preferably the same alcohol as used in the main reactor, but other alcohols or even other substantially anhydrous solvents such as organic chlorides may likewise be used, since only a negligible amount of this solvent is carried over into the main reactor. As pointed out previously, one of the principal merits of the present invention is that it has been found possible to carry out the activation of the aluminum in a step entirely separate from the actual alcoholate formation.

The foregoing general description and illustrative examples have been given to enable others to make use of the present invention. However, it will be understood that various modifications may be made without departing from the scope of the desired patent protection which is defined in the appended claims:

We claim:

1. A process for making an aluminum alcoholate from alcohol and metallic aluminum which comprises feeding granules of aluminum to an activation zone containing a liquid pool of cool activating solution, removing activated aluminum from the liquid pool and passing the removed aluminum in an oxygen-free inert atmosphere into a reaction zone containing a pool of liquid aliphatic alcohol at a temperature of about 200–300° F., and removing an alcoholic solution of aluminum alcoholate from the reaction zone.

2. A process according to claim 1 wherein the aluminum is fed to the process in the form of granules ranging in size from about 0.1 to 2 inches in diameter.

3. A process according to claim 1 wherein the alcohol is amyl alcohol.

4. A process according to claim 1 wherein the activating solution is an organic solution of a member of the group consisting of mercuric chloride, ferric chloride, stannic chloride, cupric chloride, boron trioxide, and iodine.

5. A process for making aluminum alcoholate which comprises passing metallic aluminum through a U-shaped activation zone partially filled with cool alcoholic solution of mercuric chloride, removing activated aluminum from the activation zone upwardly through and above the liquid level into a drainage zone filled with an inert, oxygen-free gas, draining the aluminum after it is lifted out of the solution, dropping the drained activated aluminum from the drainage zone into the vapor space of a reaction zone containing a pool of amyl alcohol maintained at a temperature between 240 and 265° F. and under a pressure between about 15 and 35 lbs. per square inch absolute, removing a stream of hydrogen-containing alcohol vapors from the reaction zone, cooling the vapors to condense the alcohol, recycling the condensed alcohol to the reaction zone to maintain the amyl alcohol pool at the desired temperature, and removing a solution of aluminum alcoholate in liquid alcohol from the reaction zone.

6. A process according to claim 5 wherein the mercuric chloride is dissolved in amyl alcohol in a concentration of about 0.5 to 2 weight percent.

7. A process according to claim 5 wherein the pool in the reaction zone contains a mixture of about equal parts by weight of amyl alcohol and a liquid hydrocarbon boiling between about 220 and 290° F.

WALTER A. REX.
RAYMOND W. WINKLER.

References Cited in the file of this patent

UNITED STATES PATENTS

| Number | Name | Date |
|---|---|---|
| 1,731,702 | Black | Oct. 15, 1929 |
| 2,543,742 | Evans | Feb. 27, 1951 |
| 2,579,251 | Coates et al. | Dec. 18, 1951 |

FOREIGN PATENTS

| Number | Country | Date |
|---|---|---|
| 245,473 | Great Britain | June 17, 1926 |
| 423,432 | Great Britain | Jan. 25, 1935 |
| 366,842 | Germany | June 24, 1919 |
| 544,690 | Germany | Feb. 4, 1932 |